United States Patent
Sosebee (10) Patent No.: US 12,201,119 B2
(45) Date of Patent: Jan. 21, 2025

(54) METHOD AND APPARATUS FOR REMOVING SKIN FROM ANIMAL PARTS

(71) Applicant: Foodmate US, LLC, Ball Ground, GA (US)

(72) Inventor: Robert Steve Sosebee, Ball Ground, GA (US)

(73) Assignee: Foodmate US, LLC, Ball Ground, GA (US)

( * ) Notice: Subject to any disclaimer, the term of this patent is extended or adjusted under 35 U.S.C. 154(b) by 0 days.

(21) Appl. No.: 18/392,851

(22) Filed: Dec. 21, 2023

(65) Prior Publication Data

US 2024/0122189 A1 Apr. 18, 2024

Related U.S. Application Data

(63) Continuation of application No. 18/102,806, filed on Jan. 30, 2023, now Pat. No. 11,882,842, which is a continuation of application No. 17/190,526, filed on Mar. 3, 2021, now Pat. No. 11,570,999.

(60) Provisional application No. 62/984,996, filed on Mar. 4, 2020.

(51) Int. Cl.
*A22C 21/00* (2006.01)
(52) U.S. Cl.
CPC ...... *A22C 21/0092* (2013.01); *A22C 21/0007* (2013.01); *A22C 21/0053* (2013.01)
(58) Field of Classification Search
CPC ............. A22C 21/0092; A22C 21/007; A22C 21/0053
USPC ....................................................... 452/125
See application file for complete search history.

(56) References Cited

U.S. PATENT DOCUMENTS

| | | |
|---|---|---|
| 3,882,570 A | 5/1975 | Zwiep et al. |
| 4,385,421 A | 5/1983 | Martin |
| 4,480,353 A | 11/1984 | Martin et al. |
| 4,562,613 A | 1/1986 | Lewis |
| 4,590,643 A | 5/1986 | Hill |
| 4,635,317 A | 1/1987 | Van der Eerden |
| 4,723,339 A | 2/1988 | Van de Nieuwelaar et al. |
| 4,896,399 A | 1/1990 | Hazenbroek |

(Continued)

FOREIGN PATENT DOCUMENTS

| | | |
|---|---|---|
| EP | 2724618 B1 | 10/2015 |
| EP | 3099179 B1 | 8/2018 |

(Continued)

OTHER PUBLICATIONS

International Search Report and the Written Opinion of the International Searching Authority for PCT/US2021/020612, mailed May 13, 2021.

*Primary Examiner* — Richard T Price, Jr.
(74) *Attorney, Agent, or Firm* — Michael Best & Friedrich LLP (57) ABSTRACT

A method of mechanically removing skin from animal parts that have a bone part extending therein, including moving the animal parts, suspended on shackles depending from an overhead conveyor, along a path of travel and cutting the part to separate the skin therefrom. The part moves into a skinning station in which the part is urged into engagement with skinning rolls. The skinning rolls are rotated and engage and draw the skin of the part therebetween. The skin is progressively pulled downwardly and away from underlying meat of the animal part as the part moves forwardly along its path of travel.

20 Claims, 8 Drawing Sheets

(56) References Cited

U.S. PATENT DOCUMENTS

| | | | |
|---|---|---|---|
| 4,993,113 | A | 2/1991 | Hazenbroek |
| 5,015,213 | A | 5/1991 | Hazenbroek |
| 5,098,336 | A | 3/1992 | DeLong |
| 5,173,077 | A | 12/1992 | Van den Nieuwelaar et al. |
| 5,186,680 | A * | 2/1993 | Conaway .......... A22C 21/0092 452/125 |
| 5,188,559 | A | 2/1993 | Hazenbroek |
| 5,197,917 | A | 3/1993 | Verbakel et al. |
| 5,240,454 | A | 8/1993 | Martin et al. |
| 5,306,203 | A | 4/1994 | Martin et al. |
| 5,312,291 | A | 5/1994 | Van den Nieuwelaar et al. |
| 5,429,549 | A | 7/1995 | Verrijp et al. |
| 5,462,477 | A | 10/1995 | Ketels |
| 5,472,377 | A | 12/1995 | Andrews et al. |
| 5,490,812 | A | 2/1996 | Schaarschmidt |
| 5,542,879 | A | 8/1996 | Kunig et al. |
| 5,637,038 | A * | 6/1997 | Davis ................ A22C 21/0092 452/130 |
| 5,713,787 | A | 2/1998 | Schoenmkers et al. |
| 5,833,527 | A * | 11/1998 | Hazenbroek ......... A22C 21/003 452/169 |
| 5,890,956 | A | 4/1999 | Habenicht et al. |
| 5,976,004 | A | 11/1999 | Hazenbroek |
| 6,142,863 | A | 11/2000 | Janssen et al. |
| 6,264,542 | B1 | 7/2001 | Gasbarro |
| 6,299,524 | B1 | 10/2001 | Janssen et al. |
| 6,322,438 | B1 | 11/2001 | Barendregt et al. |
| 7,059,954 | B2 | 6/2006 | Annema et al. |
| 7,232,365 | B2 | 6/2007 | Annema et al. |
| 7,662,034 | B2 | 2/2010 | Van Hillo et al. |
| 8,157,625 | B2 | 4/2012 | Hazenbroek et al. |
| 8,187,060 | B1 | 5/2012 | Gasbarro |
| 8,277,294 | B2 | 10/2012 | Van Hillo et al. |
| 8,430,728 | B2 | 4/2013 | Hazenbroek |
| 8,535,122 | B2 | 9/2013 | Hazenbroek et al. |
| 8,568,208 | B2 | 10/2013 | Van Hillo et al. |
| 8,591,298 | B1 | 11/2013 | Watson et al. |
| 8,632,380 | B2 | 1/2014 | Stooker et al. |
| 8,727,839 | B2 | 5/2014 | Hazenbroek |
| 8,808,068 | B2 | 8/2014 | Stooker et al. |
| 8,961,274 | B1 | 2/2015 | den Boer et al. |
| 9,155,316 | B2 | 10/2015 | Souli et al. |
| 9,167,823 | B2 | 10/2015 | Stooker et al. |
| 9,226,512 | B2 | 1/2016 | Van Hillo et al. |
| 9,259,013 | B2 | 2/2016 | Slagboom et al. |
| 9,615,591 | B1 | 4/2017 | Stooker et al. |
| 9,826,748 | B2 | 11/2017 | Hazenbroek et al. |
| 9,974,317 | B2 | 5/2018 | Stooker et al. |
| 10,258,052 | B2 | 4/2019 | Van Den Berg et al. |
| 10,357,042 | B1 | 7/2019 | Sosebee |
| 10,463,052 | B2 | 11/2019 | Hazenbroek |
| 10,477,872 | B1 | 11/2019 | Sosebee |
| 10,765,122 | B2 | 9/2020 | Hazenbroek et al. |
| 11,570,999 | B2 | 2/2023 | Sosebee |
| 2002/0090903 | A1 | 7/2002 | Annema et al. |
| 2005/0059334 | A1 | 3/2005 | Haley et al. |
| 2010/0029186 | A1 | 2/2010 | Janssen et al. |
| 2010/0221991 | A1 | 9/2010 | Hagendoorn et al. |
| 2011/0059684 | A1 | 3/2011 | Van Den Nieuwelaar et al. |
| 2013/0157553 | A1 | 6/2013 | Haines et al. |
| 2014/0120816 | A1 | 5/2014 | Stooker et al. |
| 2016/0270413 | A1 | 9/2016 | Bos et al. |
| 2019/0037862 | A1 | 2/2019 | Slagboom et al. |
| 2019/0142021 | A1 | 5/2019 | Van Hillo |
| 2019/0387757 | A1 | 12/2019 | Hazenbroek et al. |
| 2020/0138048 | A1 | 5/2020 | Woltman et al. |
| 2023/0165262 | A1 | 1/2023 | Sosebee |

FOREIGN PATENT DOCUMENTS

| | | |
|---|---|---|
| NL | 2009718 C2 | 5/2014 |
| WO | WO2016/122314 A1 | 8/2016 |
| WO | WO2017/131513 A1 | 8/2017 |
| WO | WO2020/162757 A2 | 8/2020 |

* cited by examiner

METHOD AND APPARATUS FOR REMOVING SKIN FROM ANIMAL PARTS

CROSS REFERENCE TO RELATED APPLICATIONS

The present patent application is a continuation of U.S. patent application Ser. No. 18/102,806, filed Jan. 30, 2023, which is a continuation of U.S. patent application Ser. No. 17/190,526, filed Mar. 3, 2021, now U.S. Pat. No. 11,570,999, issued on Feb. 7, 2023, which claims the benefit of U.S. Provisional Patent Application No. 62/984,996, filed Mar. 4, 2020.

INCORPORATION BY REFERENCE

U.S. patent application Ser. No. 18/102,806, filed Jan. 30, 2023, Ser. No. 17/190,526, filed Mar. 3, 2021, now U.S. Pat. No. 11,570,999, issued on Feb. 7, 2023, and U.S. Provisional Patent Application No. 62/984,996, filed Mar. 4, 2020, is specifically incorporated by reference herein as set forth in their entireties.

TECHNICAL FIELD

The present disclosure relates to a method and apparatus for removing skin from animal parts. The present disclosure also relates to removing skin from animal parts as an automated step as part of an animal part processing operation; and to an apparatus for performing the skin removal step in combination with other steps of the animal part processing method.

BACKGROUND

Being able to automatically remove the skin from the animal parts is of great importance to the food processing industry, given increasing preferences by consumers for skinless meat products, especially skinless poultry products. Furthermore, as manually removing the skin from the animal part generally is a tedious process, and due to today's convenience focused society, there is an increasing demand for purchasing animal meat that is skinless and ready to cook.

Various methods and apparatuses have been developed for removing skin from animal parts. Typically, these methods and apparatuses have involved feeding an animal part into a skin remover unit where a gripper roller grips the skin of the animal part and a knife blade separates the skin from the animal part, after which the gripper roller pulls the detached skin away from the animal part. The detached skin may fall from the gripper roller, or be removed by the stripper roller. Such skin removal units often have been a separate animal part processing station, with operators required to manually move and load the animal parts to the location of the skin remover unit. Other systems for use as part of an in-line process also have been developed, though there is still a need for enhanced consistency in the skin removal process.

Accordingly, there remains a growing demand for methods and apparatuses that incorporate the automatic skin removal step into food processing lines. The present disclosure is therefore directed to a method and apparatus for assisting in the substantially automated removal of skin from animal parts that addresses the foregoing and other related and unrelated problems in the existing art.

SUMMARY

Briefly described, the present disclosure is directed to methods and an apparatus for removing skin from animal parts that have a bone part extending therethrough. The methods and apparatus further generally are adapted for use as part of an automated animal part processing line or system, for example, providing an automated skinning station or unit mounted along a cut-up line for poultry.

In one aspect, the apparatus and methods of the present disclosure allow the skin of an animal part to be removed as a step or operation along an automated inline processing system/operation, wherein a series of animal parts are conveyed along an overhead conveyor system moving through an automated processing machine or system, the parts suspended from shackles or holders depending from a chain or other overhead conveying mechanism. The overhead conveyor moves the animal parts suspended from the shackles along a given conveying path. While travelling along the conveying path, the animal part will encounter different processing stations/steps, including a processing step for removing the skin from at least a portion of the animal part. Therefore, the apparatus and method(s) of the present disclosure lends itself to incorporating the skin removal step as part of an overall meat stripping and removal operation.

Optionally, the bone part can comprise one or more elongate bones extending through the animal part, such as a leg and thigh with bone portions extending therethrough. It will be appreciated that in view of poultry parts "leg" can refer to the drumstick or to the entire leg. Herein "leg" is used to refer to the drumstick and "whole leg" is used to refer to the entire leg. Optionally, a knuckle can protrude from the leg and can provide a natural and convenient way of holding the animal part from its shackle. Optionally, the animal part is an item of poultry, and still further optionally can include a poultry carcass or parts of poultry carcasses such as chicken, quail, turkey, duck, swan, and/or goose.

In one aspect of a method of removing skin from an animal part according to the present disclosure, a poultry carcass, or a part thereof such as a thigh and leg, can be suspended from a shackle or other carrier for movement along a path of travel through an automated cutting system or line. For example, as a series of legs and thighs are moved along the path of travel, the thighs, drums, and other portions can be separated and stripped of meat. Including a skinning station according to the principles of the present disclosure in the meat processing operation for separating meat from thigh bones, allows thigh meat to be substantially fully processed with other portions of the carcass in a single meat processing operation.

Optionally, the skin from the thigh is removed prior to separating the thigh meat from the thigh bones. Best results have been achieved by first removing the skin of the thigh and/or leg and then performing other steps necessary for separating the meat from the bone(s) of the thigh and/or leg.

Prior to moving into the skinning station, the legs and thighs can be moved through an upstream cutting station wherein one or more cutting blades will cut into the part; for example, cutting into the drum meat between the thigh and leg. The blades generally will cut through the skin and at least partially through the tissue connecting the skin and meat adjacent the joint and down to the tendons between the leg and thigh bones.

Thereafter, the legs and thighs will be passed into the automated skinning station or skinning unit. The skinning station or unit can include an upstream skinning assembly, optionally including a set of first or upstream guide mechanisms.

The skinning unit can include a pair of skinning rolls. The pair of skinning rolls is mounted with their longitudinal axes substantially parallel, forming a nip between the two skinning rolls. Preferably the skinning rolls rotate at the same speed in opposite directions. It will be appreciated that other skinning units can be considered, such as a roll and knife skinning unit having a knife edge extending parallel to a skinning roll.

In embodiments, the guide mechanisms can be resilient and/or compressible. The guide mechanisms can include a primary guide wheel. The guide mechanism can further include a secondary guide wheel. One of the guide wheels, or both guide wheels, can be resilient and/or compressible. Each of the guide wheels can, for example, be formed from a resilient and/or compressible material. The guide wheels also can be arranged and configured to engage and bias or urge the legs and thighs toward the skinning unit, e.g. the pair of skinning rolls. However, alternative guide mechanisms can be used, such as a conveyor belt arranged and configured to engage and bias or urge the legs and thighs toward the skinning unit.

It is also possible that at least one and/or each of the guide wheels has a resilient outer circumferential portion, e.g. formed of sections resiliently compressible towards an axis of the wheel. It is also possible that at least one and/or each of the guide wheels has a resilient outer circumferential portion, e.g. formed of rigid sections resiliently movable towards an axis of the wheel. It is also possible that each guide wheel is resiliently suspended, such that the rotational axis of the guide wheel is biased towards the pair of skinning rolls. When the guide wheel is suspended resiliently, the guide wheel itself can be rigid. The guide wheels can have a series of recesses and/or cavities configured to enable compression of portions of the at least one guide wheel as the portions of the at least one guide wheel are rotated against the animal parts. A circumferential pitch of the recesses and/or cavities matches a pitch of animal parts on the conveyor.

Optionally, in use, the skinning unit will be arranged at a distance from the overhead conveyor such that the thigh generally is first engaged by a perimeter of the primary guide wheel. The skinning unit can be arranged horizontally spaced from a path of conveyance followed by the animal parts suspended from the overhead conveyor. The primary guide wheel will be rotated with the forward movement of the legs and thighs as they are conveyed along their path of travel, and will bear against the thighs, directing the thighs toward and against the rotating skinning rolls. The primary guide wheel further can be compressible, resilient or resistant to an extent such that the thighs are pressed against the skinning rolls sufficient to enable a gripping engagement of the skin of the thighs by the skinning rolls, e.g. by teeth of the skinning rolls, for instance at an area adjacent the cut between the leg and thigh, but without the meat being engaged and pulled between the skinning rolls, e.g. the teeth thereof.

In one aspect, the skinning rolls can include a pair of elongated rolls each having helical teeth formed therealong. The helical teeth extend at a helix angle, i.e. the angle between the helix and a line on the surface of the roll parallel to the longitudinal axis. The helix of one of the skinning rolls can be wound in the opposite direction relative to the other of the skinning rolls. The helix angle of the one skinning roll can be of equal magnitude and opposite sine to the helix angle of the other skinning roll. The skinning rolls further can extend at an angle, downwardly and away from the overhead conveyor and the legs and thighs moving therealong.

Each of the skinning rolls also will be rotated, generally at a rate approximately matched to the rate of movement of the thighs by the overhead conveyor. As the thighs are directed toward and against the skinning rolls by the primary guide wheel, the skin along the thighs will be engaged and pulled between the helical teeth of the skinning rolls as the skinning rolls are rotated. The secondary guide wheel will be located downstream from the primary guide wheel and can help further guide the thighs along the skinning rolls and maintain the engagement of the skin of the thighs with the skinning rolls.

As the parts continue to be carried forwardly along their path of travel by the shackles of the overhead conveyor, the skin of the thighs will be pulled along the downwardly sloping skinning rolls, which exerts a downward or substantially vertically directed pulling force on the skin of the thighs. Such coordinated motion whereby the legs and thighs continue their forward movement/travel while the skin of the thighs is both pulled downwardly and forwardly, as well as away from the thigh in a horizontal direction perpendicular to the direction of movement of the thighs, in concert with the forward movement of the thighs, enables the skin to be removed in a substantially straight downwardly and away from the thighs directed motion. As a result, a substantially consistent and more complete removal of the skin can be provided.

The downward angle of the skinning rolls and their rotational speed can be chosen in relation to a conveying speed of the overhead conveyor, such that the thighs are enabled to continue their movement along their conveying path without being substantially pulled rearwardly and/or without a substantial drag being exerted thereon, such that the skin can be pulled in a substantially straight motion or operation, downwardly and away from the thigh portions thereof.

Terms such as "substantially no drag" and "substantially straight downward motion" as used herein at least include a force vector of force exerted by the skinning rolls onto the thigh, relative to the moving thigh, which force vector generally being composed of a horizontal force component in the direction of movement of the thigh and a vertical force component, is vertical within 15 degrees, preferably within 10 degrees. It will be appreciated that some minor experimentation can yield a suitable rotational speed for a given downward angle and/or helix angle.

Alternatively, or additionally, the downward angle of the skinning rolls, i.e. the angle, $\alpha$, between the longitudinal axis of the skinning rolls and horizontal, can be substantially equal to the helix angle, $\beta$, of at least one of the skinning rolls, i.e. the angle between the helix and a line on the surface of the roll parallel to the longitudinal axis. Preferably the helix angle of at least the upper skinning roll, $\beta_u$, and the downward angle, $\alpha$, are substantially equal, such as equal within 15 degrees, and preferably within 5 degrees, of being equal. Preferably the helix angle, $\beta_u$, of the upper skinning roll is such that the helix is substantially horizontal, such as horizontal within 15 degrees, and preferably within 5 degrees, of horizontal, at the side of the skinning roll facing the thigh and/or leg. Hence, the helical teeth of the upper skinning roll can impart a substantially downward force onto the skin of the thigh and/or leg, while at the same time allowing the skin to slide along the helix in forward direction. The helical teeth of the lower skinning roll can be wound in the opposite direction relative to the upper skinning roll. The helix angle, $\beta_l$, of the lower skinning roll can be of equal magnitude and opposite sine to the helix angle, $\beta_u$, of the upper skinning roll.

A surface velocity of the skinning rolls due to rotation is preferably equal to or higher than the conveying speed of the overhead conveyor. Hence, the skinning rolls effectively carry the skin into the nip between the skinning rolls while the thigh and/or leg moves past the skinning rolls. In some embodiments the surface velocity of the skinning rolls can be substantially equal to, e.g. within, 25%, and preferably within 10%, of the conveying speed divided by the sine of angle α. In this way the helical teeth of the lower skinning roll can impart a forward speed to the thigh and/or leg that is substantially equal to the conveying speed.

In addition or optionally, a secondary or downstream skinning assembly, which similarly can include a set of guide wheels and skinning rolls, also can be provided. The downstream set of guide wheels and skinning rolls can have a similar construction to the upstream guide wheels and skinning rolls, and can be arranged in a substantially mirror or opposite alignment along the path of travel of the legs and thighs, being oriented to engage and strip skin from along opposite side/facing legs and thighs that may not be engaged by the upstream guide wheels and skinning rolls, i.e., the downstream skinning assembly can be oriented to engage left hand/side legs and/or thighs, while the upstream skinning assembly will be oriented to engage right hand/side legs and/or thighs. The guide wheels and skinning rolls of the downstream skinning assembly also can help ensure substantially complete removal of the skin from the thighs.

Optionally, the skinning unit or station can be adjustably mounted along the automated processing line or system and can accommodate a variety of different size legs and thighs or carcasses. For example, since a chicken thigh is smaller than a turkey thigh, it is desirable that the entire skin remover unit may be adjusted relative to the overhead conveyor and the shackle to accommodate for the processing of different types of animals and/or different types of animal parts. In another aspect, the skinning unit or station can be used to remove skin from the thighs or legs or from both the legs and thighs together, i.e. from the whole legs.

Furthermore, it will be understood that the processing line or apparatus is modular and may include different processing stations for performing different method steps. Optionally, the shackle can rotatably depend from the overhead conveyor, and in some method steps it may be desirable that the thigh or other animal part be rotated by its shackle so as to be substantially coextensive with a longitudinal extend of the bone of the animal part.

Optionally, the automated processing system or line further can comprise at least a hanger station, a first tissue cutting station, and a meat stripper station. As mentioned above, the processing system generally is modular and lends itself well to the incorporation of additional processing stations for carrying out additional processing steps. Optionally, the skinning unit can be arranged in various positions or locations, such as after the first tissue cutting station, and before the meat stripper station for removal of the skin prior to stripping the meat from the thigh and/or leg.

Although the method and the apparatus for performing the method according to the present disclosure may be discussed in different sections and/or steps, it will be appreciated that the above description and features of the method according to the present disclosure are also applicable to the apparatus according to the present disclosure, and that the above description and features of the apparatus according to the present disclosure are also applicable to embodiments of the method according to the present disclosure.

In one aspect, a method of mechanically removing skin from animal parts that have a bone part extending therein, comprising moving the animal parts along a path of travel suspended from a conveyor; engaging each animal part with a first guide wheel;

biasing the animal parts toward a series of skinning rolls; entrapping a portion of skin of the animal part between the skinning rolls; and as the animal parts continue movement along their path of travel, pulling the skin downwardly and at a rate and at an angle sufficient to pull the skin in a substantially straight downward motion and away from underlying meat of the animal part.

Biasing the animal parts toward a series of skinning rolls can comprise rotating a guide wheel into engagement with the animal parts, the guide wheel comprising a resilient material and having a series of cavities configured to enable compression of portions of the guide wheel as the first guide wheel is rotated against the animal parts.

The skinning rolls can extend at an angle downwardly with respect to the path of travel of the animal parts and exert a downward force to pull the skin away from the meat.

In further aspects, an apparatus is disclosed, comprising a conveyor moving the animal parts along a predefined path of travel; at least one cutting station arranged along the path of travel of the animal parts; and a skinning unit arranged along the path of travel and including at least one guide configured to, in use, bias the animal parts toward a series of skinning rolls, the at least one guide being compressible so as to urge the animal parts against the skinning rolls so as to cause a portion of skin of the animal parts to be pulled between a gap of the skinning rolls and away from meat of the animal parts, without pressing the meat itself into engagement with the skinning rolls.

The conveyor can comprise an overhead conveyor, and a series of shackles rotatably depending from the overhead conveyor and carrying the animal parts. The skinning unit can be positioned after the at least one cutting station, and before a meat stripper station.

The at least one guide wheel is rotatable into engagement with the animal parts. The at least one guide wheel can be formed from a resilient, compressible material and having a series of cavities configured to enable compression of portions of the at least one guide wheel as the compression portions of the at least one guide wheel are rotated against the animal parts.

The skinning rolls can comprise elongated rolls each having helically extending teeth, and wherein the skinning rolls are oriented at a downwardly sloping angle with respect to the path of travel of the animal parts. Still further, the skinning rolls can be rotatable in opposite directions and at a rate that substantially matches a rate of movement of the animal parts moving along the overhead conveyor to facilitate a substantially straight, downward pulling of the skin away from the meat of the animal parts.

It will also be clear that the skinning unit having the described angled skinning rollers can be used with or without the guide mechanism. It will also be clear that the skinning unit having the described guide mechanism can be used with angled skinning rollers or horizontal skinning rollers.

The aspects as covered by the appended claims as well as other aspects, features and advantages of the present disclosure will be explained in further detail in the description below in reference to the accompanying drawings briefly described below. It further will be appreciated that any of the aspects, features and options described with respect to the methods apply equally to the apparatus of the present disclosure, and vice versa. It will also be clear that any one or more of the aspects, features and/or options discussed herein can be combined.

BRIEF DESCRIPTION OF THE DRAWINGS

It will be appreciated that for simplicity and clarity of illustration, elements illustrated in the figures have not necessarily been drawn to scale. For example, dimensions of some of the elements may be exaggerated relative to other elements. Examples incorporating the teachings of the present disclosure are shown and described with respect to the drawings and are provided by way of non-limiting illustration. It is noted that the figures are on the schematic representations of examples of the present disclosure, in which.

DETAILED DESCRIPTION

The present disclosure is directed to an apparatus and methods of removing the skin from animal parts as part of an automated processing line, machine or system 1 (FIGS. 1-5) along which the animal parts P (FIG. 2) can be segmented and the skin and meat thereof removed. For purposes of illustration, the present disclosure is shown in an example for removing the skins from poultry thighs and/or legs of poultry carcasses, such as chickens, turkeys, geese and other types of poultry. However, it will be understood that while the removal of the skin S from poultry thighs is illustrated and discussed herein, other types of animal parts, such as legs or whole legs, also can be skinned/processed using the methods and apparatus according to the principles of the present disclosure.

Figure 1:
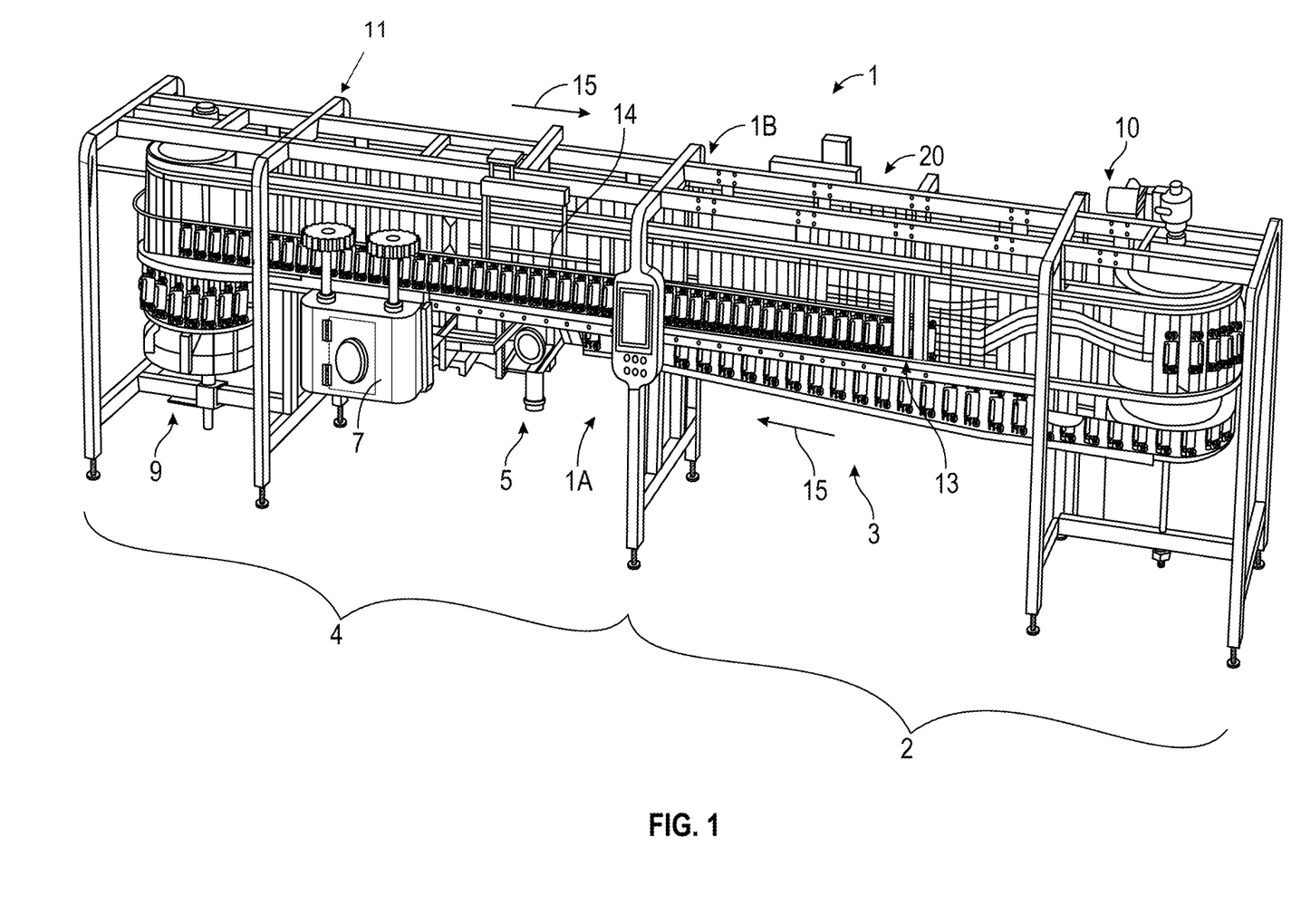
FIG. 1 is a schematic illustration of an automated processing line, system or machine for harvesting meat from animal parts or carcasses.

An example of a machine 1 for harvesting surrounding meat from poultry parts such as articulated first and second poultry bones (e.g. thighs and legs) in accordance with the present disclosure is shown in FIG. 1. The machine 1 in FIG. 1 is shown from a front side 1A, with a first or right hand part, side or portion, indicated by 2, including a loading section or station 3, and a second, left hand part, side or portion indicated by 4, which can include various processing stations, such as, by way of non-limiting example, a shackle level resetting station 5 and an X-ray bone detection unit 7. The machine 1 also can include a series of stations along a rear side 1B thereof, including a cutter station or unit 9, for example, a J-cutter station, and a meat stripper station 10. It will be understood that the machine 1 may have fewer or more processing stations, and, while various processing or cutting stations have been disclosed, different combinations of processing stations, including a series of different processing stations, also can be provided.

As illustrated in FIGS. 1-5, The machine 1 generally will include a frame 11 that supports the various operative stations or units at a predetermined height above ground level. The loading section 3 (FIG. 1) will present a succession of poultry leg suspension shackles 13, which are suspended from an overhead conveyor line 14 and are conveyed along a path of travel in a conveying direction 15. In this example, the shackles 13 are conveyed to/past one or more workers (not shown) who can hang parts such as poultry legs and thighs into the individual shackles 13, with each part suspended by a protruding knuckle of its leg(s).

It is possible that the machine 1 can be arranged for processing either left-hand or right-hand legs and/or thighs. It is also possible that the machine is arranged for both left-hand and right-hand legs and/or thighs. In the latter case, the cutter station 9 can include cutter units for left-hand legs and/or thighs and cutter units for right-hand legs and/or thighs. The cutter station 9 can e.g. include alternately cutter units for left-hand legs and/or thighs and cutter units for right-hand legs and/or thighs.

As the parts enter and pass though the cutter station, cutting blades will cut into each of the parts adjacent a joint between the leg and thigh bones. The cutting blades will cut through the skin and meat between the thigh and drum (leg) and down to the tendons holding the bones together, generally cutting to a depth sufficient to separate or detach the meat and skin from around the knee joint between the bones, while leaving the tendons substantially intact for holding the bones together. Thereafter, the parts will be conveyed into the skinning station or unit 20, which generally is arranged upstream from subsequent processing or meat stripping stations or units 10 (FIG. 1) that can remove the thigh meat and/or drum meat from the bones of the parts.

Figure 2:
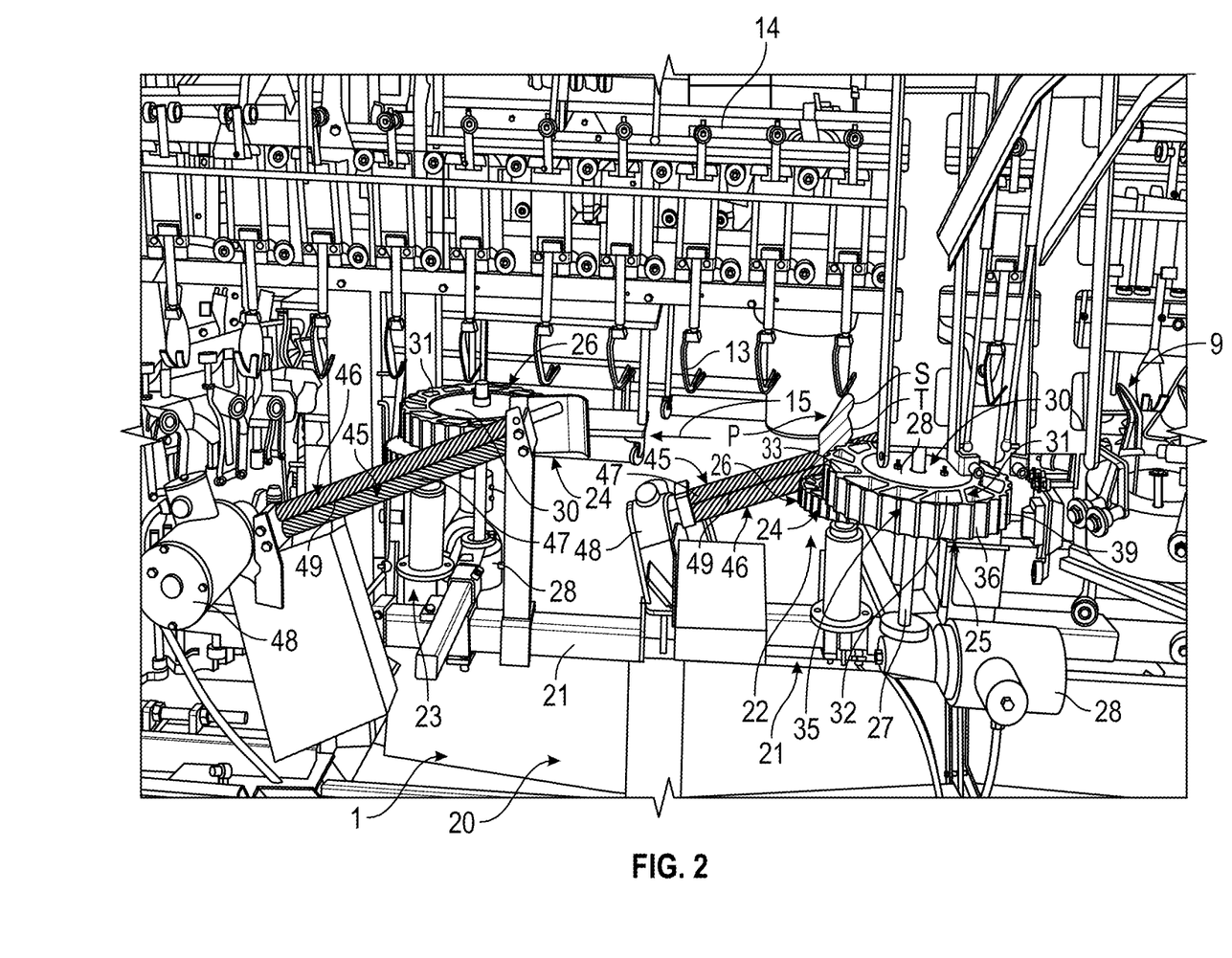
FIG. 2 is a side view illustrating a skinning station or skinning unit.

FIGS. 2-6B illustrate embodiments and aspects of a skinning station or unit 20 according to the principles of the present disclosure. As generally illustrated in FIG. 2, the skinning unit 20 generally can include an adjustable frame 21 that is mountable to the frame of the automated processing line or machine 1. In this example, the skinning unit 20 is configured to enable varying size parts P to be received and skinned without requiring substantial adjustments or repositioning of the unit to accommodate differing size parts. However, the location or positioning of the skinning unit 20 with respect to the overhead shackles 13, and thus the parts being conveyed along the path of travel 15, can be adjusted as needed so as to locate and/or orient the skinning unit in substantial alignment with the path of travel of the parts being conveyed by the overhead shackles. For example, turkey legs and thighs are generally larger than chicken legs and thighs, and the skinning unit can be adjusted to accommodate such larger variations in sizes.

In this example, the skinning unit 20 includes a first or upstream skinning assembly 22, and a second or downstream skinning assembly 23. In this example, each of the skinning assemblies 22 and 23 have substantially the same/similar constructions, but are oriented and/or arranged in opposing, substantially mirrored arrangements, located along opposite sides of the path of travel 15 of the parts.

As indicated in FIG. 2, the skinning assemblies each include guide mechanisms 24, which, here include a series of guide wheels 25 and 26. The first or leading guide wheel 25 generally can comprise an initial or primary guide wheel, while the second guide wheel 26 will comprise a secondary guide wheel. In this example each of the guide wheels is resilient. Here, each of the guide wheels generally will be formed from a resilient, compressible material. Each guide wheel can be mounted on a driveshaft 27 and will be rotatable into engagement with the parts moving through the skinning unit. In this example the guide wheels 25, 26 are formed from a food grade material such as a rubber, synthetic, plastic or other food grade material having a desired resiliency and/or compressibility.

Figure 8A:
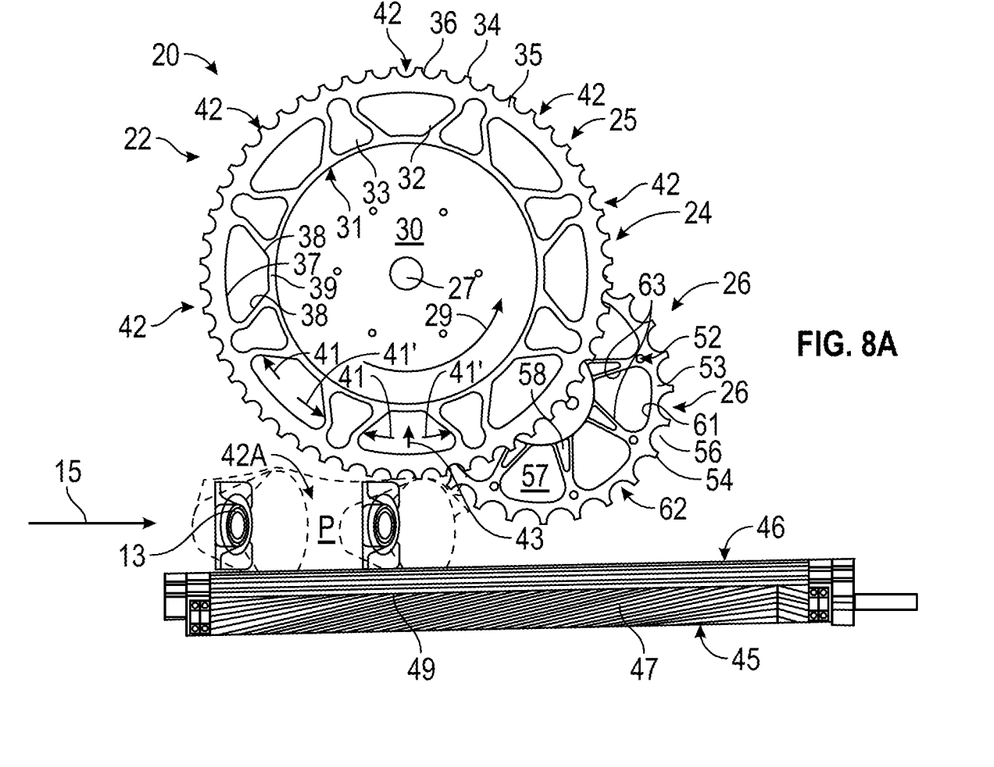
FIGS. 8A and 8B are schematic illustrations showing an example of a method of skinning an animal part conveyed through the skinning unit or station.
Figure 8B:
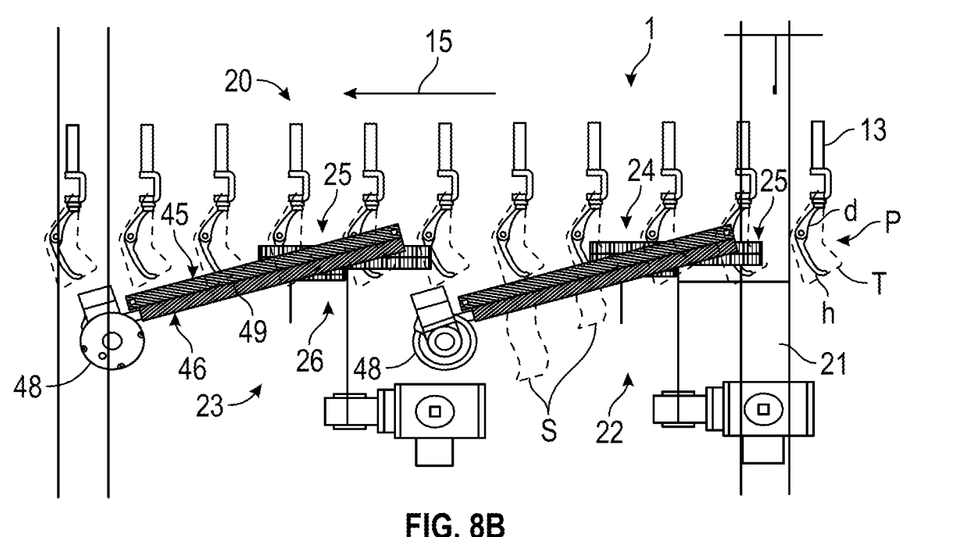

In the example of FIG. 2, the primary guide wheel 25 is driven or rotated, such as by a drive motor 28, in the direction of arrow 29 into bearing engagement with the parts P, as indicated in FIGS. 8A-8B. The rotation of the primary guide wheel is driven at a rate that substantially matches the rate of movement of the parts along their path of travel 15 by the overhead conveyor, i.e. the surface speed of a perimeter of the primary guide wheel matches a speed of movement of the parts along their path of travel. As further indicated in FIGS. 2-4, the secondary guide wheel 26 will be arranged downstream and located at an elevation spaced below the primary guide wheel, and can be driven, or can be allowed to rotate freely with the movement of the thigh portions of the parts in engagement therewith.

As shown in FIGS. 2, 6A, 6B and 8A the primary guide wheel 25 can include a center hub portion 30 with a circumferential portion 31 arranged thereabout. The circumferential portion 31 further can be formed with a series of alternating shaped cavities and/or recesses 32/33. The circumferential portion 31 further can be formed with a series of spaced teeth 34 arranged about the outer periphery 35 thereof. Recesses 36 can be defined between the teeth 34.

As further indicated in FIG. 8A, the alternating cavities and/or recesses 32 and 33 formed about the primary guide wheel 25 generally will be provided with differing configurations. In this example, the first recesses or cavities 32 are shown with a substantially trapezoidal shape, with an elongated arcuate outer portion 37 extending parallel to the outer periphery 35 of the primary guide wheel, and a pair of side walls 38 that taper inwardly to an arcuate inner portion 39. The second recesses or cavities 33 are arranged between the sloping side walls of larger, first cavities, and generally are formed with a substantially cooperative shape configured to enable the side walls of the first cavities to flex, e.g. outwardly in the direction of arrows 41 and 41', as associated engaging positions 42 defined about the periphery of the primary guide wheel engage and bear against the parts P. Other shapes of the recesses or cavities 32/33 also can be provided.

As further indicated in FIG. 8A, as the primary guide wheel 25 is rotated in the direction of arrow 29 into engagement with the parts P being moved along their conveying path 15, the teeth of the primary guide wheel along/at one of the engaging positions 42A defined about the periphery of the primary guide wheel, engage and direct/urge the thighs toward skinning rolls 45 and 46. As part of this engagement, the outer periphery 35 of the primary guide wheel is compressed. Here, the outer arcuate portions 37 of the cavities 32 corresponding to such engaging positions will be compressed inwardly, in the direction of arrow 43, while the side walls 38 thereof are urged outwardly in the direction of arrows 41 and 41'. The compressibility of the cavities and resiliency of the material of the primary guide wheel thus enables the parts to be urged into bearing engagement against a pair of skinning rolls 45 and 46 sufficient to enable the skinning rolls to affirmatively grab and pull the skins from the parts, but with the parts being sufficiently cushioned to prevent the meat of the parts from also being engaged and pulled between the skinning rolls.

The primary guide wheel 25 can be formed from one or more stacked disks, and/or can be about 1-2 inches (25.4-50.8 mm) thick, though such thickness can be varied to accommodate various size parts. The primary guide wheel further can have a diameter of approximately 14" (355.6 mm) or other diameter as selected to accommodate a variety of different size parts, with 8 of the larger, first or main cavities or recesses 32 defined about the circumferential portion thereof, providing about 8 engagement positions 42, each with an approximately 6" (152.4 mm) outer arcuate engagement area. Greater or fewer engagement positions 42 also can be provided, with the number of positions selected to match a pitch or speed of the parts being conveyed along their conveying path 15. The rotation of the primary guide wheel further will be selected so as to substantially match the movement of the parts along their conveying path.

Figure 7:
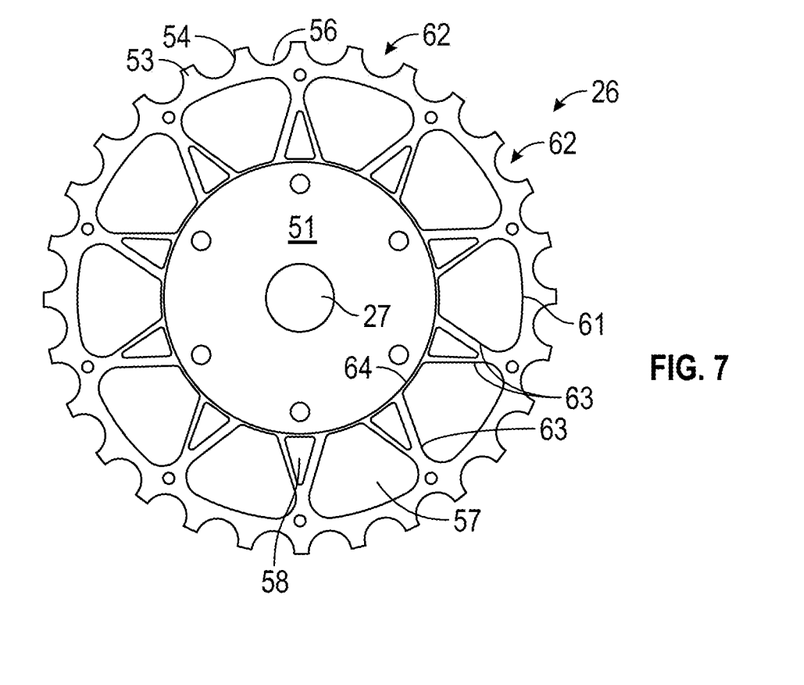
FIG. 7 is a plan view of a secondary guide wheel for use in a skinning unit.

As illustrated in FIG. 7, the secondary guide wheel 26 generally can have a smaller diameter than the primary guide wheel 25, for example having a diameter of between about 10"-11" (254-279.4 mm), with a hub 51 surrounded by a circumferential portion 52 and a periphery 53 including a series of teeth 54 with recesses 56 therebetween. A series of alternating shape/size recesses and/or cavities 57/58 further will be provided in the circumferential portion 52. The first recesses or cavities 57 can have a generally trapezoidal or triangular configuration, each with an outer arcuate portion 61 defining an engagement position 62 along which the thighs will be engaged, and having inwardly tapering side walls 63 that angle toward an inner arcuate portion 64. The secondary guide wheel also can include a similar number of engaging positions to the primary guide wheel, depending on the rate of movement of the parts through the skinning station or unit.

As indicated in FIGS. 2-6B and 8A-8B, the secondary guide wheel 26 generally will be mounted slightly downstream and at an elevation below the primary guide wheel 25, and can be located/positioned along an intermediate portion of the skinning rolls. The secondary guide wheel 26 further can be approximately 1" (25.4 mm) thick and formed from a similar compressible/resilient material as the primary guide wheel.

The secondary guide wheel can be allowed to freely rotate, or can be driven, and can serve as an additional bearing mechanism to ensure that the thigh portions of the poultry parts are maintained in engagement with the skinning rolls as the legs and thighs are continued to be conveyed along their conveying path 15 by the overhead shackles. The compressible material and configuration of the cavities of the secondary guide wheel enables the secondary guide wheel to flex and compress at the engagement positions 62 in contact with the thighs to help ensure that the skin is affirmatively engaged and substantially removed from the thigh meat without the meat also being pulled into the skinning rolls.

As illustrated in FIGS. 2 and 6A-8B, the skinning rolls 45/46 generally are arranged adjacent the first and second guide wheels. The skinning rolls in this example comprise elongated toothed rolls, generally being formed from steel or similar material and having helical teeth 47 formed along their length. As can e.g. be seen in FIG. 4 the helical teeth 47 of the upper skinning roll 45 have a helix angle $ß_u$, and the helical teeth 47 of the lower skinning roll 46 have a helix angle $ß_1$. Here, the helical teeth of the lower skinning roll 46 are wound in the opposite direction relative to the helical teeth of the upper skinning roll 45. The helix angle $\beta_1$ of the lower skinning roll 46 is of equal magnitude and opposite sine to the helix angle $\beta_u$ of the upper skinning roll 45.

The skinning rolls 45/46 further generally will be oriented at an angle extending downwardly and away from the conveying path of the parts, such as indicated in FIGS. 2 and 8B, extending from an upstream end adjacent and at approximately a similar elevation as the primary guide wheel 25 downwardly at an angle and for a distance generally selected to substantially remove the skin S from the thigh portions T of the parts P. The downward angle of the skinning rolls 45/46 is indicated as angle $\alpha$ in FIG. 4. For example, the skinning rolls 45/46 can extend downwardly at an angle $\alpha$ of between approximately 15° to 20° and in some embodiments between approximately 17° to 19°; although the angle and length of the skinning rolls can vary depending up on the parts being skinned. As can e.g. be seen in FIG. 4 the downward angle $\alpha$ of the skinning rolls 45/46 can be substantially equal to the helix angle $\beta_u$, of the upper skinning roll, such that the helical teeth are substantially horizontal, such as horizontal within about 15 degrees, and preferably within 5 degrees of horizontal, at the side of the skinning roll facing the thigh and/or leg.

Figure 4:
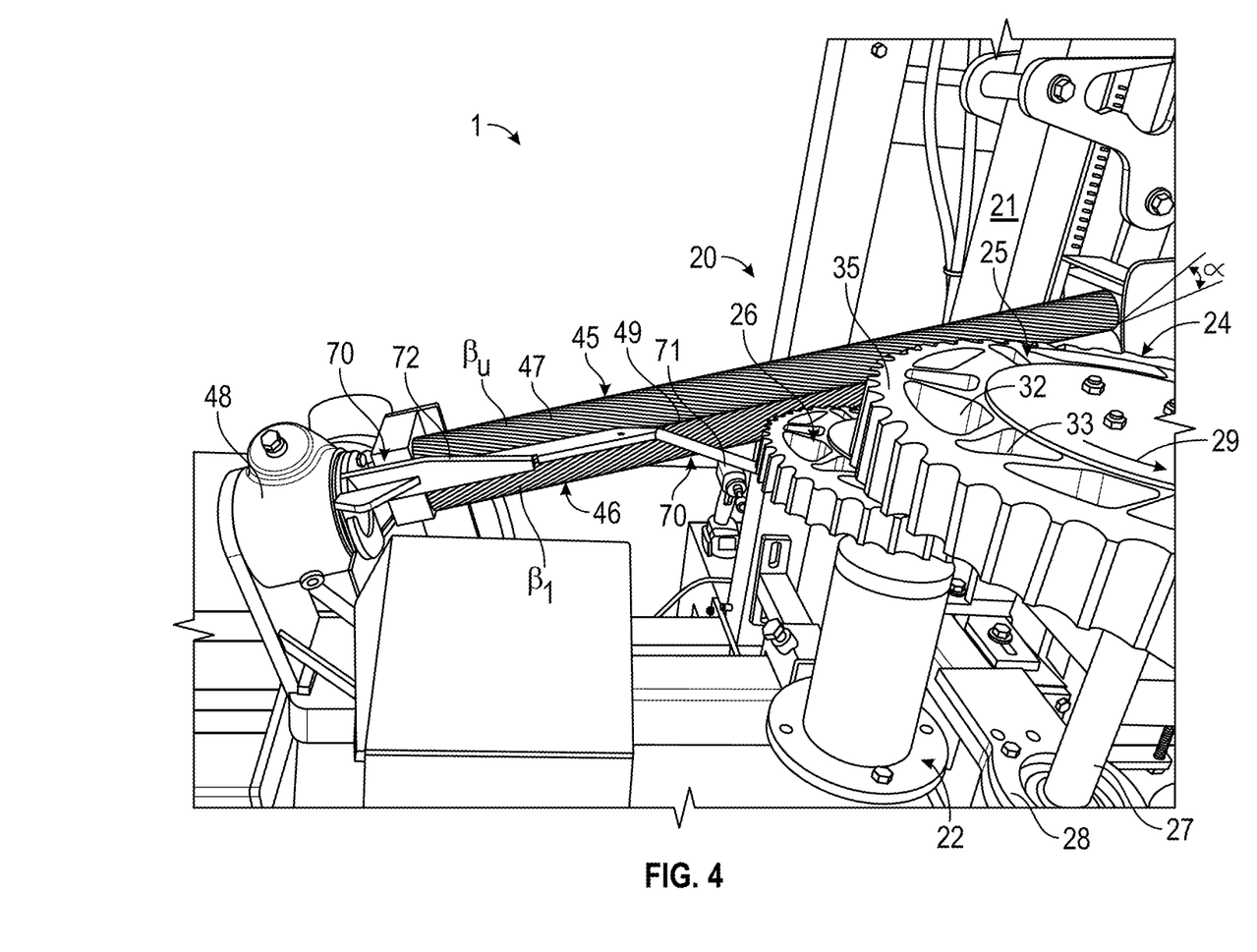
FIG. 4 is a further perspective view illustrating a pair of skinning rolls of the skinning unit of FIGS. 2-3.
Figure 5:
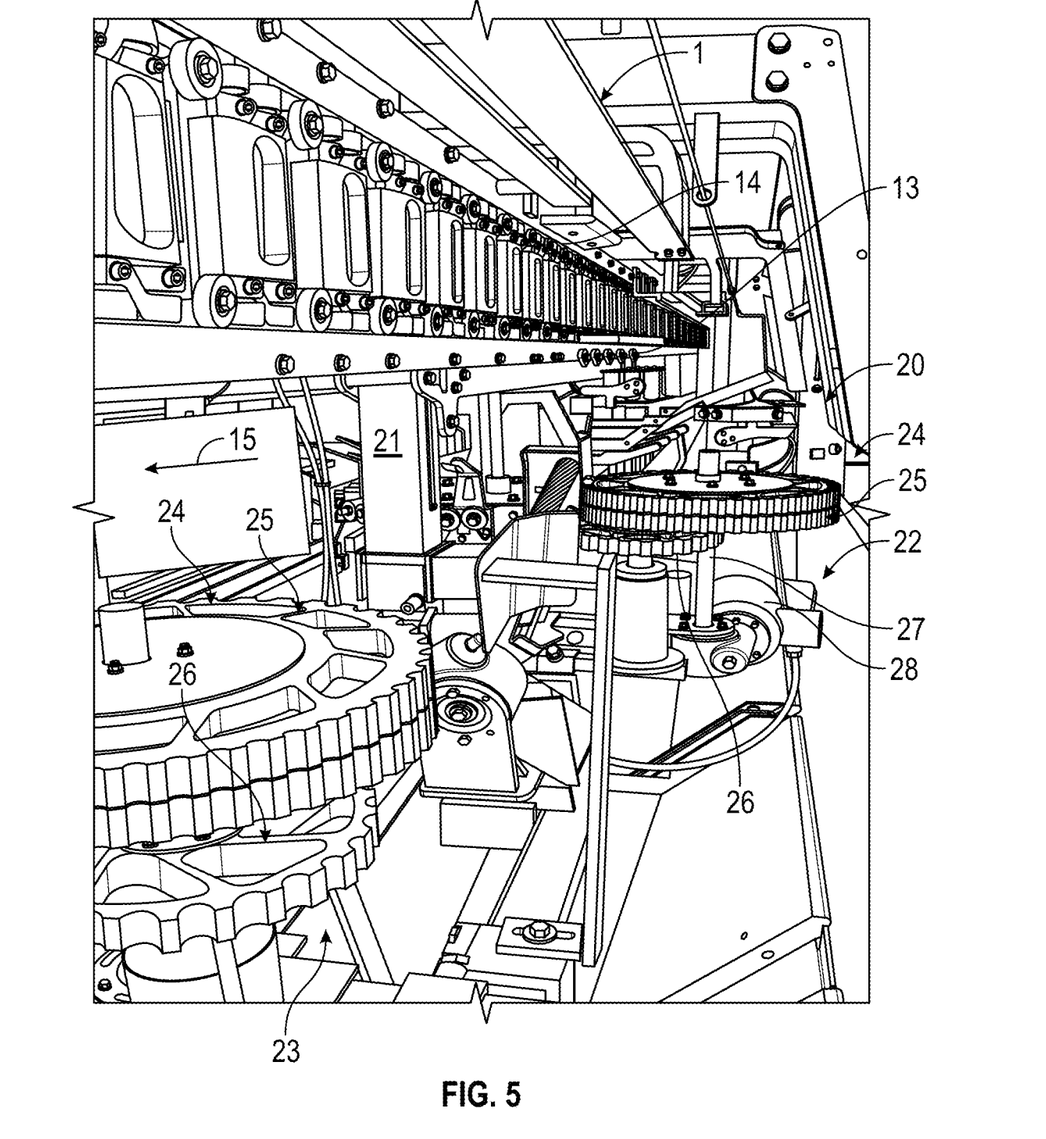
FIG. 5 is an end view of the skinning unit of FIGS. 2-4.

In this example, the skinning rolls are mounted in a substantially parallel, vertically stacked arrangement in a frame or holder and will each be rotated by a drive motor 48. The skinning rolls also can be rotated in opposite directions so that their helical teeth 47 will rotate towards each other. Such opposed rotation will help grip and pull the skin of the thigh portions into the nip or engagement area 49 defined therebetween in a substantially consistent pulling motion.

As indicated in FIG. 8B, as the parts enter the skinning station, the thighs T thereof generally will pass between the primary wheel 25 and the upstream or proximal end of the skinning rolls 45/46. The primary guide wheel will urge the thighs against the skinning rolls, as generally illustrated in FIGS. 8A and 8B. The rotation of the skinning rolls will enable the helical teeth 47 thereof to affirmatively grip and pull the skin of the thigh portions of each of the parts into the nip or meshed engagement area 49 between the teeth of the skinning rolls.

The skinning rolls further will be driven at approximately an equivalent speed to the speed of movement of the parts along their conveying path as they are carried by the overhead shackles 13. The rotation of the skinning rolls and downward slope or angled orientation applies a generally vertically directed pulling force to the skin. The skinning rolls also apply a pulling force to the skin in a generally horizontal direction perpendicular to the conveying direction, away from the thigh. As a result, the parts are enabled to continue their movement along their conveying path without being substantially pulled rearwardly or a substantial drag being exerted thereon, such that the skin can be pulled in a substantially straight motion or operation, downwardly and away from the thigh portions thereof.

With the skin being pulled/removed in a downward, generally straight motion as the parts continue their movement along their conveying path, the skin can be more substantially removed, including being pulled away from the fatty portions along the rear portions of the thighs, while allowing such fatty portions (which are desirable for cooking of the thighs) to remain with at least a portion of the thigh as the thigh meat is stripped from the thigh bone in downstream processing stations. The skin is enabled to drop below the skinning unit and can be guided into a collection bin or other receptacle such as by slides or other ramps below the skinning rolls.

Figure 3:
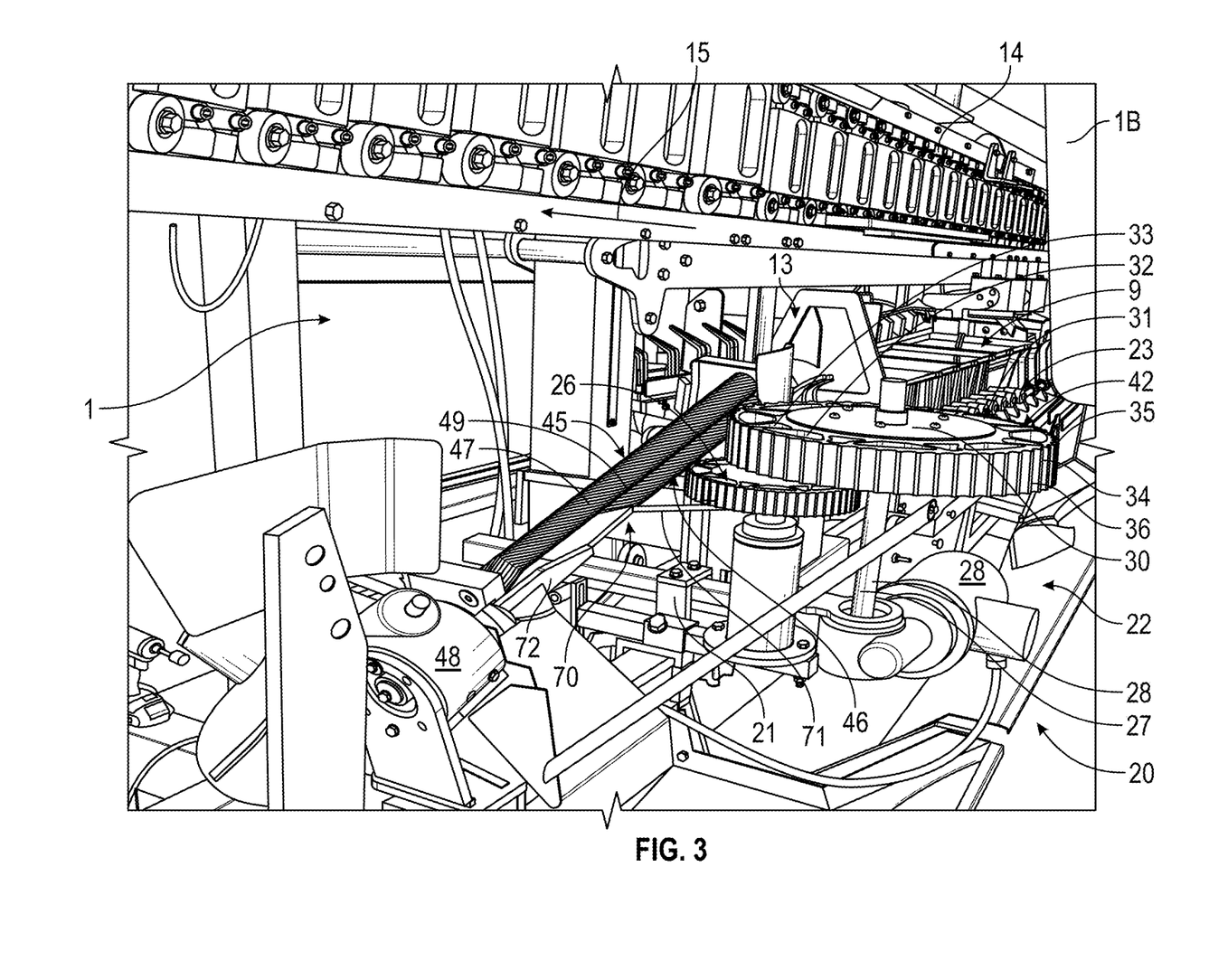
FIG. 3 is a perspective view of a portion of the skinning unit of FIG. 2.

As indicated in FIGS. 3-4, optionally, a further guide 70 can be provided adjacent the downstream section or end of the skinning rolls. The downstream guide can include a guide bar or rail that extends from an upstream location 71 adjacent the secondary guide wheel to the distal end 72 of the skinning rolls 45/46. The guide rail 51 generally can be configured and arranged so as to help direct and maintain the skin being removed from the thighs between the skinning rolls to help further ensure a substantially complete and clean removal of the skin from the thigh portions.

As noted above and as illustrated in FIGS. 2 and 6A-6B, the skinning unit 20 further can include a downstream or secondary skinning assembly 23, which similarly can include a set of guide wheels and skinning rolls. The downstream or secondary skinning assembly 23 can, however, be optional.

Figure 6A:
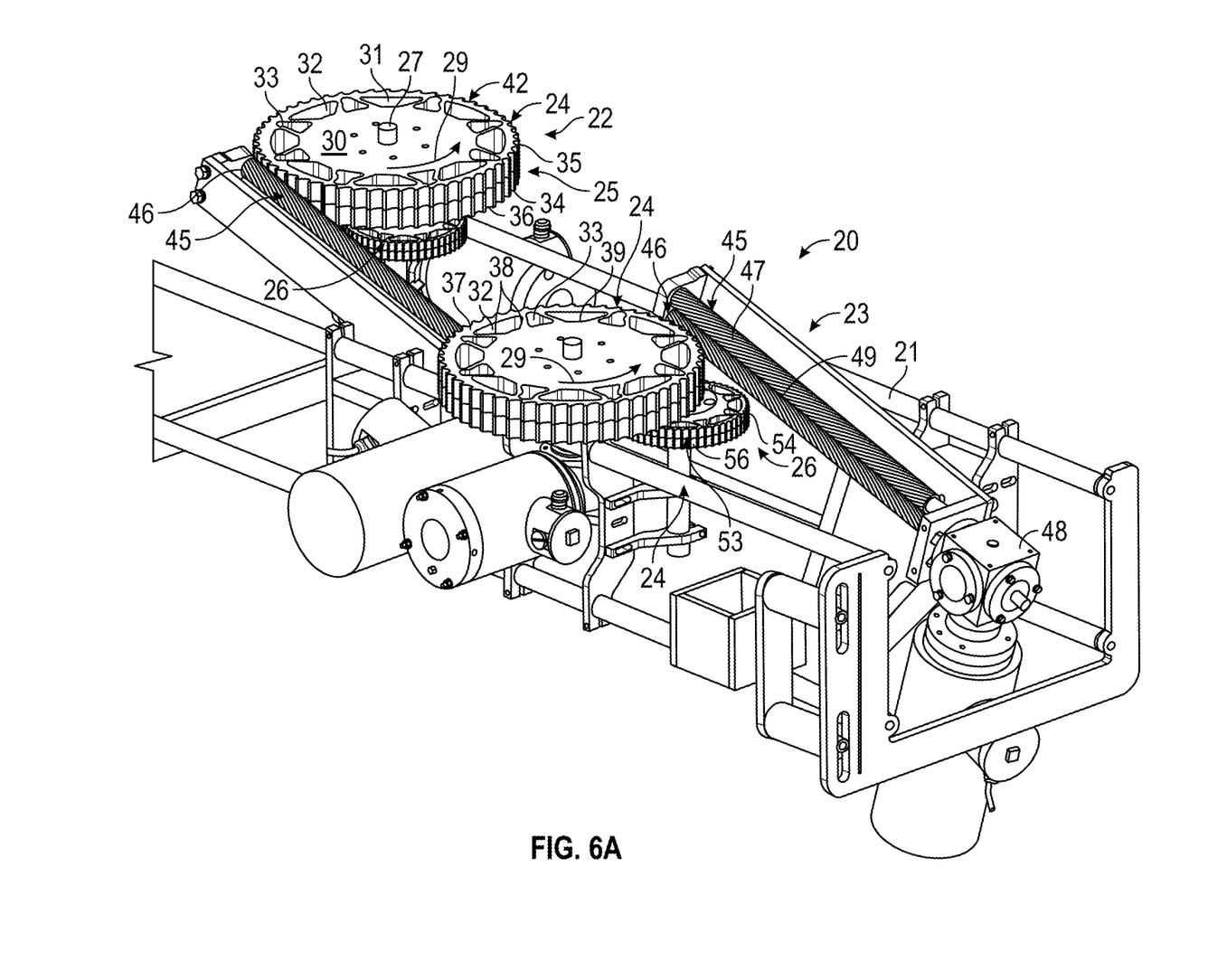
FIG. 6A is a schematic illustration of the skinning unit of FIGS. 2-5.
Figure 6B:
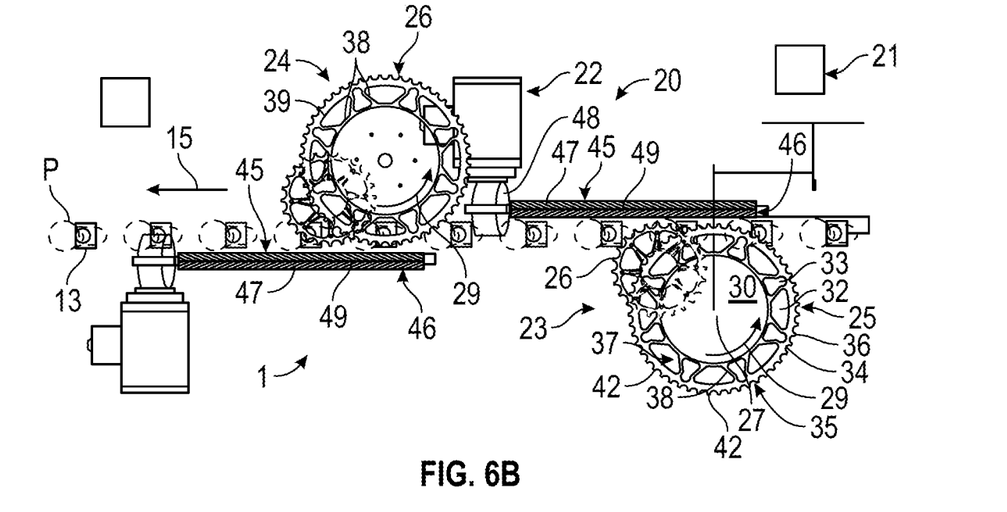
FIG. 6B is a plan view schematically illustrating the skinning unit of FIG. 6A.

In addition, as indicated in FIGS. 6A-6B, the guide wheels and skinning rolls of the secondary skinning assembly 23 can be arranged so as to engage opposite facing parts, for example, left hand thighs and/or legs, as needed. Generally, the guide wheels 25/26 and skinning rolls 45/46 of the upstream skinning assembly 22 will be able to accommodate both left and right hand leg and thigh parts. However, in some instances, where left hand or right hand parts may not be engaged by the guide wheels and skinning rolls of the upstream skinning assembly 22, the guide wheels and skinning rolls of the downstream skinning assembly 23 will engage and help ensure removal of the skin therefrom.

As further noted above, the construction of the guide wheels and skinning rolls of the secondary or downstream skinning station generally can be the same as the set of guide wheels and skinning rolls of the first or upstream skinning station, but can be arranged in mirror or opposite arrangement with respect to the path of travel of the parts to help ensure substantially complete skin removal from the parts.

It will be understood by those skilled in the art that while the present disclosure illustrates the removal of skin from the thigh portions of a connected leg and thigh part of poultry, it also would be possible to utilize the skinning unit or station of the present disclosure for the removal of skin from a complete or whole leg portion of animal parts such as poultry.

In addition, after the skin has been removed from the part such as the thigh portion of the poultry part, the part will continue its movement along its conveying path into a downstream stripping station 10 (FIG. 1) at which the thigh meat can be stripped from the thigh bone and thereafter the thigh bone can be separated from the drum or leg, which further can be subsequently processed as needed or desired in later or downstream stations.

It is thus believed that the operation and construction of the apparatus and method of removing skin from animal parts according to the principles of the present disclosure will be apparent from the foregoing description. To the skilled person in this field of the art it will be clear that the present disclosure is not limited to any particular embodiment as may be represented and described herein, but rather, within the framework of the appended claims, a large number of variants are possible. Also, kinematic inversions are considered inherently disclosed and to be within the scope of the present disclosure. The terms comprising and including when used in this description or the appended claims should not be construed in an exclusive or exhaustive sense but rather in an inclusive sense. Expressions such as: "means for . . . " should be read as: "configured for . . . " or "constructed to . . . " and should be construed to include equivalents for the structures disclosed. The use of expressions like: "preferred", "especially preferred" etc. likewise is not intended to limit the present disclosure. Features which are not specifically or explicitly described or claimed may be additionally included in the structure and methods disclosed according to the principles of the present disclosure without deviating from its scope.

What is claimed is:

1. A method of removing skin from meat of animal parts, comprising:
   conveying the animal parts along a path of travel;
   moving the animal parts through a skinning station;
   wherein the skinning station comprises at least one pair of stacked skinning rolls positioned along the path of travel;
   as the animal parts move through the skinning station, urging each animal part into contact with the skinning rolls such that a portion of the skin of each animal part is captured between the skinning rolls; and
   pulling the skin from the animal parts;
   wherein the skinning rolls are oriented at a downwardly sloping angle with respect to the path of travel such that the skin is of each animal part is pulled in a substantially straight downward motion and away from the meat of each animal part by the skinning rolls as the animal parts continue to move forward along the path of travel.

2. The method according to claim 1, wherein each animal part includes a bone extending through the animal part and having a bone part protruding outwardly from the animal part; and further comprising separating the meat from the bone of each animal part after removal of the skin therefrom.

3. The method according to claim 1, wherein urging each animal part into contact with the skinning rolls comprises engaging each animal part with at least one guide as each animal part enters the skinning station, wherein the at least one guide is adapted to bias each animal part toward the skinning rolls sufficient to cause the portion of skin of each animal part to be pulled into an engagement area between the skinning rolls, substantially without engaging the meat of the animal part with the skinning rolls.

4. The method according to claim 1, wherein pulling the skin from the animal parts comprises rotating the skinning rolls at approximately a same speed and in opposite directions.

5. The method according to claim 1, wherein urging each animal part into contact with the skinning rolls comprises receiving each of each animal part within a recess or cavity of at least one guide wheel and rotating the at least one guide wheel with movement of each animal part through the skinning station so as to direct each animal part toward the skinning rolls.

6. The method according to claim 1, wherein the animal parts comprise a right hand part and a left hand part, and wherein urging each animal part into contact with the skinning rolls comprises engaging and urging one of the right hand part or the left hand part toward contact with a first pair of skinning rolls with a first guide as each animal part enters the skinning station, and as each animal part moves engaging and urging an opposite one of the right hand part or left hand part with a second guide wheel and biasing the right hand part or left hand part toward a second pair of skinning rolls.

7. The method according to claim 1, wherein pulling the skin from the animal parts comprises rotating the skinning rolls in opposite directions and at a rate that substantially matches a rate of movement of the animal parts moving along the path of travel to facilitate the substantially straight, downward motion for pulling of the skin away from the meat of the animal parts.

8. An apparatus for processing animal parts, comprising:
   a conveyor having a plurality of shackles, the shackles configured to support the animal parts as the animal parts are moved along a predefined path of travel;
   at least one skinning assembly arranged along the path of travel, the at least one skinning assembly comprising:
     at least one guide arranged adjacent the conveyor in a position to engage the animal parts as the animal parts are moved into the at least one skinning assembly; and
     at least one pair of skinning rolls adjacent the at least one guide, the at least one pair of skinning rolls comprising an upper skinning roll having helical teeth extending at a first helix angle and a lower skinning roll having helical teeth extending at a second helix angle, and wherein the second helix angle has a substantially equal magnitude and opposite sine to the first helix angle;
   wherein the at least one guide is configured to urge the animal parts against the skinning rolls as the animal parts are moved through the at least one skinning assembly so as to cause a portion of skin of the animal parts to be pulled into a gap between the skinning rolls and away from meat of the animal parts; and
   wherein the upper skinning roll and the lower skinning roll of the at least one pair of skinning rolls are arranged in a stacked arrangement and are oriented at a downwardly sloping angle with respect to the path of travel of the animal parts such that as the animal parts continue movement along their path of travel, the skin is pulled in a substantially straight downward motion and away from the meat of each animal part by the skinning rolls.

9. The apparatus according to claim 8, wherein the at least one guide comprises at least one guide wheel rotatable into engagement with the animal parts.

10. The apparatus according to claim 9, wherein the at least one guide wheel includes a series of recesses and/or cavities configured to receive the animal parts therein; and wherein as the at least one guide wheel is rotated the animal parts are carried within the recesses and/or cavities thereof into contact with the skinning rolls sufficient to cause the skin to be engaged between the helical teeth of the skinning rolls without pressing the meat into engagement with the helical teeth of the skinning rolls.

11. The apparatus according to claim 8, wherein the at least one guide comprises a first guide wheel arranged along the path of travel, and a second guide wheel arranged along the path of travel and located downstream from the first guide wheel, each of the first and second guide wheels comprising a series of recesses and/or cavities spaced about a circumference thereof; and wherein a circumferential pitch of the recesses and/or cavities matches a pitch of animal parts on the conveyor.

12. The apparatus according to claim 8, wherein the at least one guide comprises a compressible material adapted to enable compression of the at least one guide upon engagement with the animal parts.

13. The apparatus according to claim 8, wherein at least the first helix angle of the helical teeth of the upper skinning roll is substantially equal to the downwardly sloping angle at which the upper skinning roll and the lower skinning roll are oriented.

14. The apparatus according to claim 8, further comprising at least one cutting station arranged along the path of travel of the animal parts; and at least one meat stripper station located along the path of travel of the animal parts downstream from the at least one skinning assembly.

15. An apparatus, comprising:
a conveyor moving a series of animal parts along a predefined path of travel;
at least one processing station positioned along the path of travel of the animal parts;
wherein the at least one processing station includes at least one skinning assembly including at least one pair of stacked skinning rolls positioned along one side of the path of travel of the animal parts;
wherein the skinning rolls are oriented at a downwardly sloping angle with respect to the path of travel and each include helical teeth; and
at least one guide positioned along an opposite side of the path of travel of the animal parts from the at least one pair of stacked skinning rolls, the guide configured to urge the animal parts into contact with the skinning rolls sufficient to cause a portion of skin of the animal parts to be pulled into an engagement area between the skinning rolls and away from meat of the animal parts as the animal parts continue to move along the path, of travel of the animal parts without pressing the meat into engagement with the skinning rolls.

16. The apparatus according to claim 15, wherein the at least one skinning assembly comprises a first skinning assembly and a second skinning assembly positioned along opposite sides of the path of travel of the animal parts and each including a pair of stacked skinning rolls; and wherein the skinning rolls of each of the first skinning assembly and second skinning assembly are rotated at a rate that substantially matches a rate of movement of the animal parts moving along the conveyor so as to facilitate a substantially straight, downward pulling of the skin away from the meat of the animal parts.

17. The apparatus according to claim 15, wherein the at least one guide comprises a compressible material so as to enable compression of the at least one guide as the animal parts are urged into contact with the skinning rolls.

18. The apparatus according to claim 15, wherein the at least one guide comprises a guide wheel having a series of recesses and/or cavities configured to receive the animal parts therein; and wherein as the guide wheel is rotated, the animal parts are carried within the recesses and/or cavities of the guide wheel into contact with the skinning rolls sufficient to enable the skin of the animal parts to be pulled into the engagement area between the skinning rolls.

19. The apparatus according to claim 15, wherein the at least one pair of stacked skinning rolls comprises an upper skinning roll and a lower skinning roll; wherein the helical teeth of the upper skinning roll extend at a first helix angle and the helical teeth of the lower skinning roll extend at a second helix angle; and wherein the second helix angle has a substantially equal magnitude and opposite sine to the first helix angle.

20. The apparatus according to claim 19, wherein at least one of the first helix angle of the helical teeth of the upper skinning roll or the second helix angle of the helical teeth of the lower skinning roll is substantially equal to the downwardly sloping angle at which the upper skinning roll and the lower skinning roll are oriented.

* * * * *